US008359003B1

(12) United States Patent
Gailloux et al.

(10) Patent No.: US 8,359,003 B1
(45) Date of Patent: Jan. 22, 2013

(54) ALTERNATIVE TEXT BILLING SYSTEM AND METHOD

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 262 days.

(21) Appl. No.: 12/643,990

(22) Filed: Dec. 21, 2009

(51) Int. Cl.
*H04M 15/00* (2006.01)
*H04M 11/00* (2006.01)
*H04M 3/42* (2006.01)
*H04W 4/00* (2009.01)

(52) U.S. Cl. ........ 455/406; 455/408; 455/466; 455/405; 455/414.1; 379/114.21; 379/114.23; 379/114.17; 379/114.01

(58) Field of Classification Search .......... 455/405–408, 455/414.4, 414.2, 466, 432.3; 705/1.1, 40, 705/39, 14, 26
See application file for complete search history.

(56) References Cited

U.S. PATENT DOCUMENTS

| 5,822,411 | A * | 10/1998 | Swale et al. ............. 379/114.22 |
| 6,285,749 | B1 * | 9/2001 | Manto ...................... 379/114.23 |
| 2005/0265529 | A1 * | 12/2005 | Hogg et al. ................ 379/114.2 |
| 2007/0203836 | A1 | 8/2007 | Dodin |
| 2008/0268812 | A1 * | 10/2008 | Meincke ....................... 455/406 |
| 2009/0036094 | A1 * | 2/2009 | Laumen et al. ............... 455/406 |
| 2009/0042539 | A1 * | 2/2009 | Jiang et al. .................... 455/408 |
| 2009/0117923 | A1 * | 5/2009 | Berger et al. .................. 455/466 |
| 2009/0264139 | A1 * | 10/2009 | Mankovich ................... 455/466 |
| 2010/0322400 | A1 * | 12/2010 | Katzenstein ............. 379/114.21 |

OTHER PUBLICATIONS

Microsoft Press Computer Dictionary (Published Mar. 2002).*
Anonymous, "Call & Text Collect", http://site.globe.com.ph/mobilelgeneral_mobile_services/call_and_text_offers?sid=TuESrsuxpRYAABmSU98AAABDe, Jul. 21, 2009.
Bartlett, R. D., "Reply-paid Text Messaging: Suck the cash out of those generous boffins . . . ", http://www.halfbakery.com/idea/Reply-paid_20Text_20Messaging, Jan. 21, 2004.

* cited by examiner

*Primary Examiner* — Dwayne Bost
*Assistant Examiner* — Nalini Yerneni (57) ABSTRACT

An alternative billing system for communication service, comprising a gateway comprising a processor and a memory, and an application stored in the memory that, when executed by the processor, receives a text message from an originating electronic device, determines that an account balance associated with the originating electronic device lacks sufficient funds to pay for origination of the text message, sends a message to a terminating electronic device identified by the text message to inquire if the terminating electronic device wants to be billed for the origination of the text message, when a message accepting billing for the origination of the text message is received from the terminating electronic device, sends the text message to the terminating electronic device, and when a message rejecting billing for the origination of the text message is received from the terminating electronic device, does not send the text message to the terminating electronic device.

20 Claims, 6 Drawing Sheets

ALTERNATIVE TEXT BILLING SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may pay for carrier service in several ways. Two common ways are to post-pay for service or pre-pay for service. Post-paying involves subscribers paying for services that have been rendered, for example, paying for mobile services consumed during a prior period of time. As long as the subscriber pays the periodic bill according to an agreement, services may continue. Pre-paying involves establishing an account balance with a service provider to then draft against as services are utilized by the mobile device. When prepaid service funds become exhausted, the subscriber may add funds to the account in order to continue using the mobile service for the mobile device.

SUMMARY

These and other features will be more clearly understood from the following detailed description taken in conjunction with the accompanying drawings and claims.

In an embodiment, a system of alternative billing for communication service is disclosed. The system comprises a gateway comprising a processor and a memory, and an application stored in the memory of the gateway. When the application is executed by the processor of the gateway, it receives a text message from an originating electronic device, determines that an account balance associated with the originating electronic device lacks sufficient funds to pay for the origination of the text message, and sends a message to a terminating electronic device identified by the text message to inquire if the terminating electronic device wants to be billed for the origination of the text message. When a message accepting billing for the origination of the text message is received from the terminating electronic device, the application sends the text message to the terminating electronic device. When a message rejecting billing for the origination of the text message is received from the terminating electronic device, the application does not send the text message to the terminating electronic device.

A system providing alternative billing for communication service is disclosed. The system comprises a gateway comprising a processor and a memory, and an application stored in the memory that, when executed by the processor, receives a text message from an originating electronic device. The text message is directed to a terminating electronic device and comprises an indication that the billing for a reply to the text message from the originating electronic device is to be billed to an account associated with the originating electronic device. The application receives the reply to the text message from the terminating electronic device, the reply directed to the originating electronic device, and sends a message to a billing server directing that the bill for the reply be added to the account associated with the originating electronic device.

A method of billing for text messaging is disclosed. The method comprises receiving a text message from an originating electronic device, the text message addressed to a terminating electronic device, determining that a pre-paid account associated with the originating electronic device lacks funds to pay for the origination of the text message, and sending a message to the terminating electronic device. The message comprises an indication that the originating electronic device has attempted to send a text message to the terminating electronic device but lacks funds to pay for originating the text and an invitation to the terminating electronic device to pay for originating the text, receiving a confirmation message that the terminating electronic device has agreed to pay for originating the text and, based on the confirmation message, adding a billing entry to an account associated with the terminating electronic device for the origination of the text message, and based on the confirmation message, sending the text message to the terminating electronic device.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method are taught that provide a means of alternative billing for sending and/or receiving messages between mobile devices. In an embodiment, a transmitter of a message between mobile devices is billed for transmitting the message and a receiver of the message is billed for receiving the message. Communication interruptions or delays may result when either the transmitter has insufficient funds in their communication service subscriber account to pay to originate the message or the receiver has insufficient funds in their communication service subscriber account to pay to receive the message. Further, if the transmitter of the message expects a reply, sufficient funds may need to be available in the service account of the transmitter to pay both for sending the original message and for receiving a reply message, and sufficient funds may need to be available in the service account of the receiver to pay both for receiving the original message and for transmitting the reply message.

In an embodiment, a mobile device may be prevented from sending and/or receiving messages due to insufficient funds. Insufficient funds may be the result of an insufficient balance on prepaid mobile service, failure to pay billed charges for postpaid mobile service, or other reasons for insufficient funding of mobile service for a mobile device. When a mobile device attempts to send a message to another mobile device, and one of the mobile devices has insufficient funds to complete the transaction, the mobile service provider may offer the mobile device that has funds the opportunity to pay the charges for the mobile device that has insufficient funds, in order to complete the transaction. The mobile device accepting the charges may be provided with a variety of options for accepting charges for the pending message transmission, as well as for subsequent reply message transmission. Options may include accepting charges for some number of message transmissions or accepting charges for some period of time.

Figure 1:
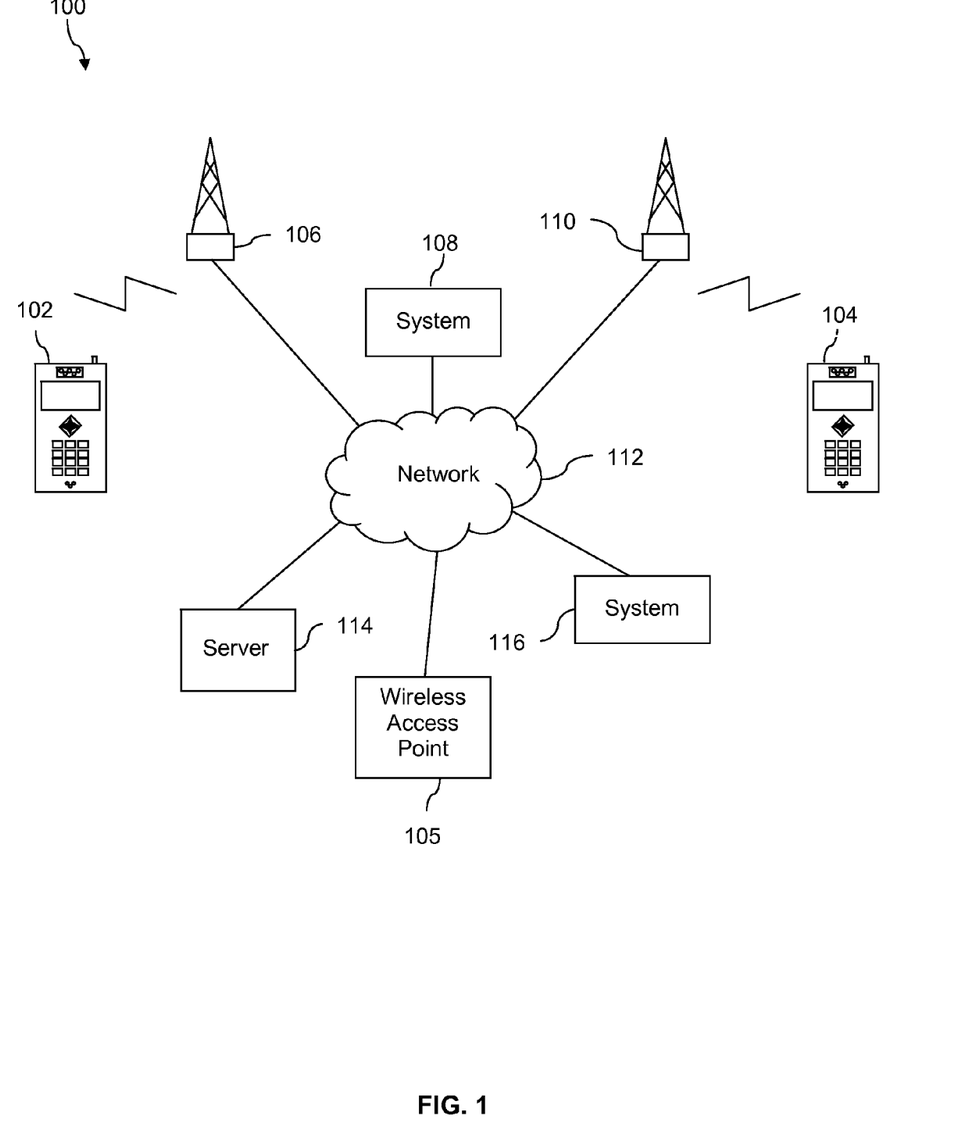
FIG. 1 illustrates an exemplary wireless communication system and mobile device suitable for implementing one or more embodiments of the disclosure.

Turning now to FIG. 1, a system 100 is described. The system 100 comprises a first mobile device 102, a second mobile device 104, a wireless access point 105, a first base transceiver station (BTS) 106, a system 108, a second base transceiver station 110, a network 112, a server 114, and a system 116. Mobile devices 102, 104 may be a mobile phone, a personal digital assistant (PDA), a media player, or other portable electronic device. For the purposes of this disclosure, though mobile devices 102 and 104 may differ in hardware, their functions may be considered to be the same or similar, unless otherwise specified. Likewise, as with mobile devices 102, 104 discussed above, BTS 106 and BTS 110 should be considered similar in function, unless otherwise noted.

In an embodiment, the first mobile device 102 may attempt to send a message to the second mobile device 104. When the message transmission is initiated, it may be routed through the system 108 of a mobile service provider. System 108 may check to see if the first mobile device 102 and/or the second mobile device 104 have sufficient funds to complete the transaction of the message transmission. System 108 may be one of a gateway server, a billing server, or other system. If, for example, the system 108 finds that the first mobile device 102 has insufficient funds to allow transmission of the message, the system 108 may suspend delivery of the message, pending resolution of an alternative billing arrangement.

System 108 may notify the first mobile device 102 that it has insufficient funds to allow for delivery of the message to the second mobile device 104, and may also notify the second mobile device 104 that the first mobile device 102 is attempting to send it a message. System 108 may further indicate that the second mobile device 104 may accept the charges for delivery of the message from the first mobile device 102, and may offer the second mobile device 104 an option to accept or decline charges for delivery of the message.

System 108 may further offer the second mobile device 104 a variety of options for accepting the charges for transmission of the message or messages from the first mobile device 102. These options may include accepting charges for the current message only, accepting charges for any/all messages between these two mobile devices, accepting charges for a given number of messages as specified by a type-in option, or accepting charges by selection from a list of numbers of messages, wherein the list of numbers may include accepting charges for one message, for five messages, for twelve messages, for all future messages between mobile devices 102 and 104, or for some other number of messages.

In addition, the system 108 may offer input control options to the second mobile device 104 such as accepting charges for messages from the first mobile device 102 to the second mobile device 104, for a period of time. These input control options may include, for example, specifying a period of time via a type-in option or selecting from a list of time periods. Time periods presented as options may be one of a number of minutes, a number of hours, a number of days, a number of weeks, or some other period of time that may include accepting charges from the first mobile device 102 to the second mobile device 104 indefinitely.

In an embodiment, when the second mobile device 104 indicates acceptance of the charges for transmission of the message from the first mobile device 102, the system 108 may complete the transmission and delivery of the message to the second mobile device 104. System 108 may also communicate details of the transaction to the system 116, wherein the system 116 may be, for example, a billing server of the mobile service provider. System 108 may also notify the second mobile device 104 that it has been charged for delivery of the message to the first mobile device 102. Notification may be via text appended to the message delivered to the second mobile device 104 from the first mobile device 102, or may be via a separate communication to the second mobile device 104.

In an embodiment, when the first mobile device 102 sends a message to the second mobile device 104, the message may pass through the system 108 of a mobile service provider. If the system 108 determines that the second mobile device 104 has insufficient funds to allow receipt of a message, the system 108 may suspend deliver of the message, pending resolution of an alternative billing arrangement. System 108 may notify the second mobile device 104 that the first mobile device 102 is attempting to send it a message, but that the message may not be delivered because the second mobile device 104 has insufficient funds to complete the transaction.

System 108 may notify the first mobile device 102 that the second mobile device 104 has insufficient funds to allow for completion of the transaction of delivering the message, and may offer the first mobile device 102 alternative billing options to allow for delivery of the message. System 108 may offer a variety of alternative billing options to the first mobile device 102. In an embodiment, an additional option may be presented to allow the first mobile device 102 to accept charges for delivery of the present message to the second mobile device 104 and/or to accept charges for the second mobile device 104 transmitting a reply message to the first mobile device 102. The reply message from the second mobile device 104 may facilitate receiving an answer to a question that may have been posed in the prior message.

In an embodiment, when the first mobile device 102 indicates a form of acceptance of the charges for delivery of the message from the first mobile device 102 to the second mobile device 104, the system 108 may complete the delivery of the message to the second mobile device 104. System 108 may communicate details of the transaction to the system 116 of the mobile service provider, wherein the system 116 is, for example, a billing server. System 108 may also notify the first mobile device 102 that it has been charged for the delivery of the message in, for example, a subsequent communication.

In an embodiment, the roles of initiator and recipient of messages between mobile device 102 and mobile device 104 may be considered as interchangeable and should not be construed as permanently-assigned roles for either mobile device. Either mobile device may assume either role in a given situation. The terms originator, terminator, sender, receiver, and other similar terms may be used to describe the present role of a mobile device when describing message transmission scenarios.

In an embodiment, a message from the first mobile device 102 to the second mobile device 104 or from the second mobile device 104 to the first mobile device 102 may be one of a short messaging service (SMS) message, a voice mail message, an interconnect call, a premium short messaging service (PSMS) message, a multimedia messaging service (MMS) message, a unified communications (UC) message, a mobile instant message (MIM) message, an unstructured supplementary service data (USSD) message, an email message, or other form of electronic message between mobile devices.

Figure 2:
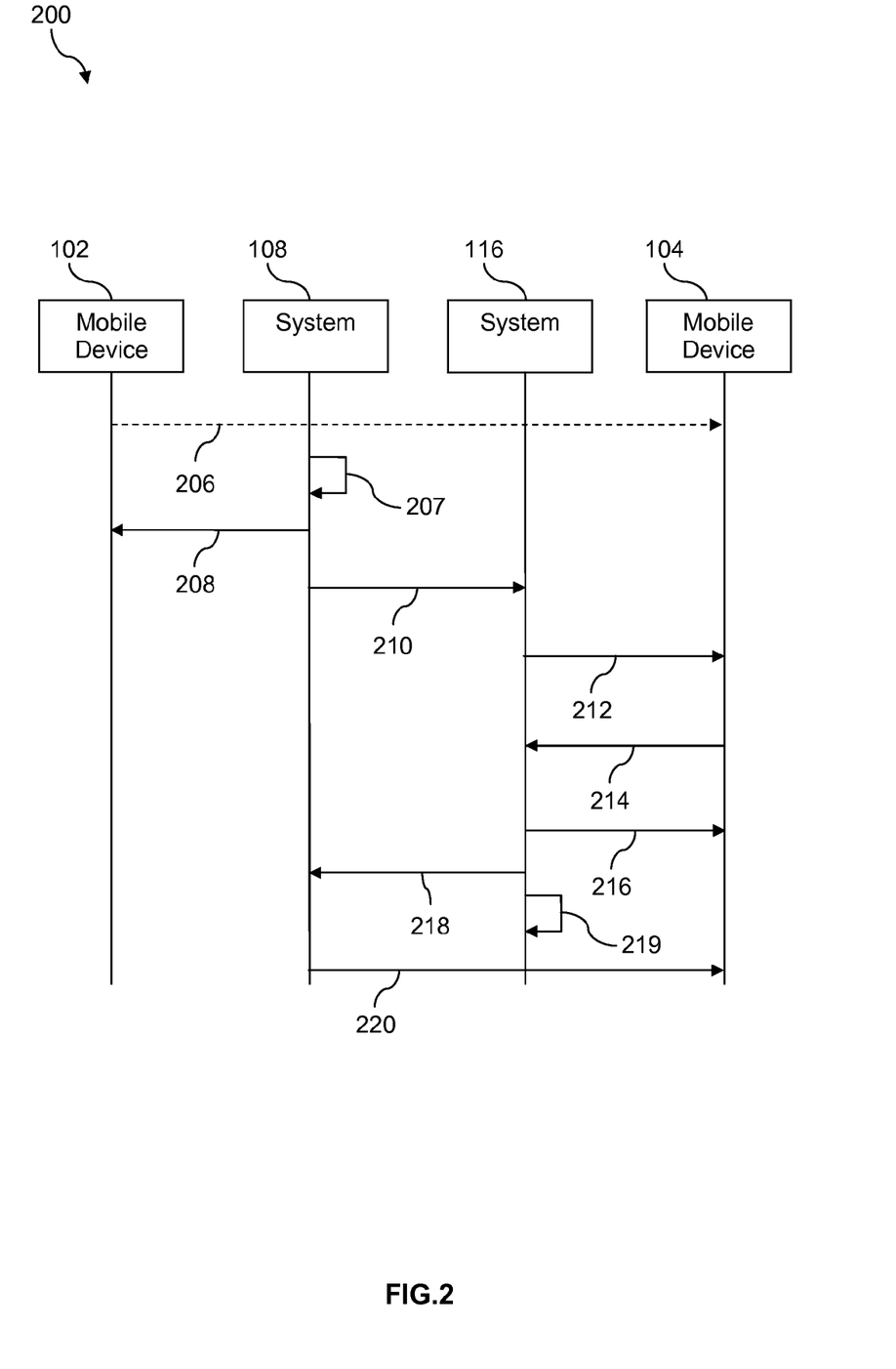
FIG. 2 illustrates a message sequence according to an embodiment of the disclosure.

Turning now to FIG. 2, a message sequence 200 is described. In the message sequence 200, the first mobile device 102 may send a message 206 to the second mobile device 104. The message 206 may pass through the system 108, en route to the second mobile device 104. System 108 may check 207 for sufficient funds for the mobile devices 102 and 104.

If, for example, the first mobile device 102 has insufficient funds to send the message 206 to the second mobile device 104, the system 108 may suspend delivery of the message 206. The dotted line of the message 206 indicates that the message 206 was initiated, but that the system 108 suspended delivery of the message 206. System 108 may then send appropriate messages to the mobile devices 102 and/or 104. For example, the system 108 may send a message 208 to the first mobile device 102 informing the first mobile device 102 that it has insufficient funds to send the message 206.

System 108 may also send a message 210 to the system 116, informing the system 116 of a unique identifier for the message 206. System 116 may associate the unique identifier for the message 206 with a location, such as a wireless access protocol hyperlink, or other location. System 116 may then send a message 212 to the second mobile device 104 indicating that the first mobile device 102 is attempting to send the message 206 to the second mobile device 104, but that the message 206 cannot be delivered because the first mobile device 102 does not have sufficient funds to complete the transaction.

Message 212 may also indicate that the second mobile device 104 may receive the message 206 from the first mobile device 102, if the second mobile device 104 will accept the charges associated with sending the message 206. Message 212 may further provide options for the second mobile device 104 to accept or reject the charges for the message 206. Options may include responses such as "I do not wish to accept the charges from mobile device 102," "I will accept the charges from mobile device 102 this time, only," "I will always accept charges from mobile device 102," "I will accept charges from mobile device 102 for X period of time," "I will accept a number Y of charges from mobile device 102," "I will accept charges from mobile device 102 for the duration of a thread," or other options. A thread may comprise a series of messages exchanged between the first mobile device 102 and the second mobile device 104 that address a common theme or subject. For example, messages associated with a common thread may contain the same subject line or otherwise indicate a continued conversation. An X period of time may be one of a selection of a number of minutes, hours, days, weeks, or other period of time. The second mobile device 104 may also be allowed to enter a time period of its own designation. The number Y of charges from the first mobile device 102 that the second mobile device 104 may indicate it will accept may be one message, two messages, five messages, twelve messages, or other number of messages. Alternatively, the second mobile device 104 may be permitted to enter a number of messages of its own designation, for which to accept charges for the first mobile device 102.

The second mobile device 104 may then respond 214 to the system 116. The response 214 may indicate a decision to, for example, accept the charge for the message 206 from the first mobile device 102 for this time, only. System 116 may respond with a message 216 containing terms and conditions for acceptance of the charge for the message 206 from the first mobile device 102. System 116 may then transmit 218 the unique message identifier back to the system 108, indicating that the second mobile device 104 will accept the charges for the message 206 from the first mobile device 102. System 108 may then utilize the unique identifier to locate 219 the message 206 and then deliver 220 the message 206 to the second mobile device 104. System 108 may also append text to the message 206, indicating that the second mobile device 104 was charged for delivery of the message 206 from the first mobile device 102. Alternatively, the system 108 may notify the second mobile device 104 of the charges in a separate communication, not shown.

Figure 3:
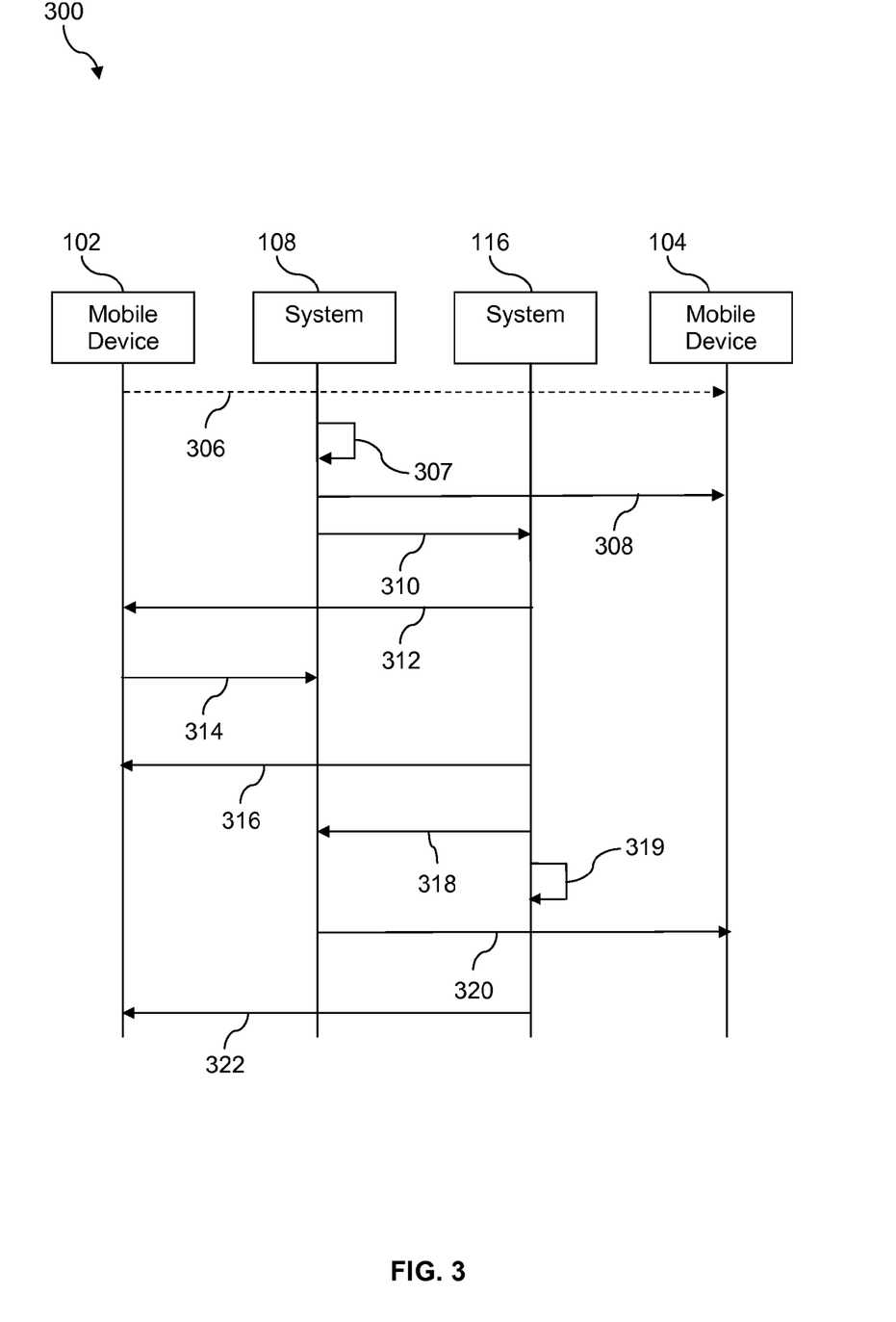
FIG. 3 illustrates a message sequence according to an embodiment of the disclosure.

Turning now to FIG. 3, a message sequence 300 is described. In the message sequence 300, the first mobile device 102 may send a message 306 to the second mobile device 104. The message 306 may pass through the system 108 en route to the second mobile device 104. System 108 may check 307 the fund balances associated with mobile devices 102 and 104. If, for example, the second mobile device 104 has insufficient funds to allow it to receive the message 306, the system 108 may suspend delivery of the message 306. The dotted line of the message 306 indicates that the message 306 was initiated, but that the system 108 suspended delivery of the message 306. System 108 may then send appropriate messages to mobile devices 102 and/or 104. For example, the system 108 may send a message 308 to the second mobile device 104 informing the second mobile device 104 that the first mobile device 102 is attempting to send the message 306 to the second mobile device 104, but that the second mobile device 104 has insufficient funds to receive the message.

System 108 may send a message 310 containing a unique identifier for the message 306 to the system 116. System 116 may associate the unique identifier to a location, for example to a wireless access protocol hyperlink or other location. System 116 may send a message 312 to the first mobile device 102 indicating that the message 306 cannot be delivered because the second mobile device 104 does not have sufficient funds to complete the transaction.

The message 312 may further indicate that the second mobile device 104 may receive the message 306 if the first mobile device 102 will accept the charges associated with delivery of the message 306 to the second mobile device 104. The message 312 may provide options for the first mobile device 102 to accept or reject the charges for the message 306. Options may include responses such as "I do not wish to accept the charges from mobile device 104," "I will accept the charges from mobile device 104 this time, only," "I will always accept charges from mobile device 104," "I will never accept charges from mobile device 104," "I will accept charges from mobile device 104 for X period of time," "I will accept a number Y of charges from mobile device 104," "I will accept charges from mobile device 104 for the duration of a thread," or other options. A thread may comprise a series of messages exchanged between the first mobile device 102 and the second mobile device 104 that address a common theme or subject. For example, messages associated with a common thread may contain the same subject line or otherwise indicate a continuous conversation. An X period of time may be one of a selection of a number of minutes, hours, days, weeks, months, years, or the second mobile device 104 may be allowed to enter a time period of its own designation. The number Y of charges the first mobile device 102 will accept may be one of a selection of numbers of messages such as one message, two messages, five messages, twelve messages, all future messages, or other number of messages. In addition, the message 312 may permit the second mobile device 104 to enter a number of messages of its own designation for which to accept charges.

The first mobile device 102 may then respond 314 to the message 312 from the system 116, indicating a decision to, for example, accept the charge for the message 306 to the second mobile device 104 this time only. System 116 may then send a message 316 to the first mobile device 102 containing terms and conditions for acceptance of the charge for delivery of the message 306 to the second mobile device 104. System 116 may then transmit 318 the unique identifier back to the system 108, indicating that the first mobile device 102 will accept the charges for delivery of the message 306 to the second mobile device 104. System 108 may then utilize the unique identifier to locate 319 the message 306 and then deliver 320 the message 306 to the second mobile device 104. System 108 may also append text into the message 306 to the second mobile device 104, indicating that the first mobile device 102 was charged for delivery of the message 306 to the second mobile device 104. System 108 may also notify the first mobile device 102 that it was charged for delivery of the message 306 to the second mobile device 104 by means of a separate communication, not shown. The system 116 may optionally send a message 322 to the first mobile device 102 indicating that the message 306 has been delivered to the second mobile device 104.

Figure 4:
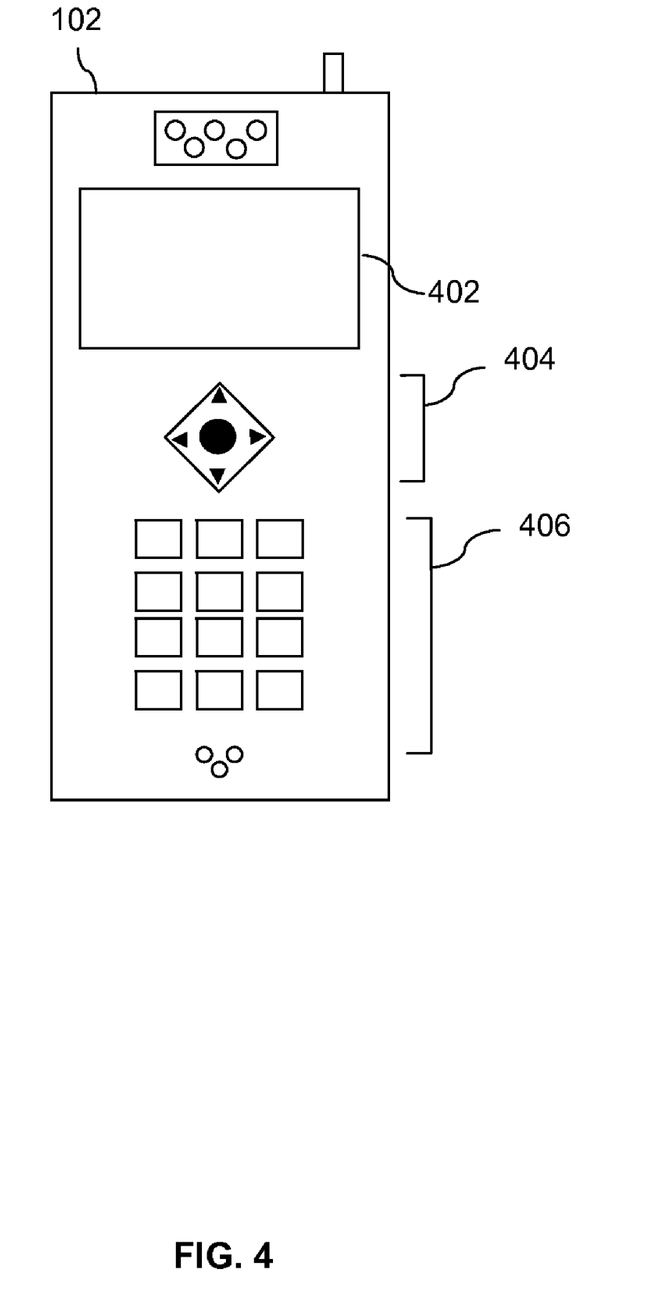
FIG. 4 illustrates a mobile device suitable for implementing several embodiments of the disclosure.

Now turning to FIG. 4, mobile device 102 is described. As mentioned above, for the sake of this disclosure, mobile device 102 and mobile device 104 may differ in terms of hardware, but should be considered the same or similar in function. For the purposes of the disclosure, the description of mobile device 102 presented herein may be considered the same as that for mobile device 104. Mobile device 102 is operable for implementing aspects of the present disclosure, but the present disclosure should not be limited to these implementations. Though illustrated as a mobile phone, mobile device 102 may take various forms including a wireless handset, a pager, a personal digital assistant (PDA), a gaming device, an inventory control device, a media player, a portable computer, a tablet computer, a laptop computer, and/or other.

Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 may include a display 402, a button, set of buttons, or touch-sensitive surface 404 for cursor movement or such on the display 402, and another touch-sensitive surface and/or keys 406 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Mobile device 102 may execute a web browser application which enables the display 402 to show a web page. The web page may be obtained via wireless communications with base transceiver station 106. The web page may also be obtained via a wireless access point 105, a server 114, a peer mobile device 102 or any other wireless communication network or system.

The wireless communication system may comprise additional base transceiver stations. In some instances, the mobile device 102 may be in communication with multiple base transceiver stations 106 at the same time. The base transceiver station 106 (or wireless access point 105) is coupled to a network 112, such as the Internet. Via the wireless link and the network, mobile device 102 may have access to information on various servers, such as a server 114, system 108, and/or system 116. The server 114 may provide content that may be shown on the display 402. Alternately, the mobile device 102 may access the base transceiver station 106 through a peer mobile device acting as an intermediary, in a relay type or hop type of connection.

Figure 5:
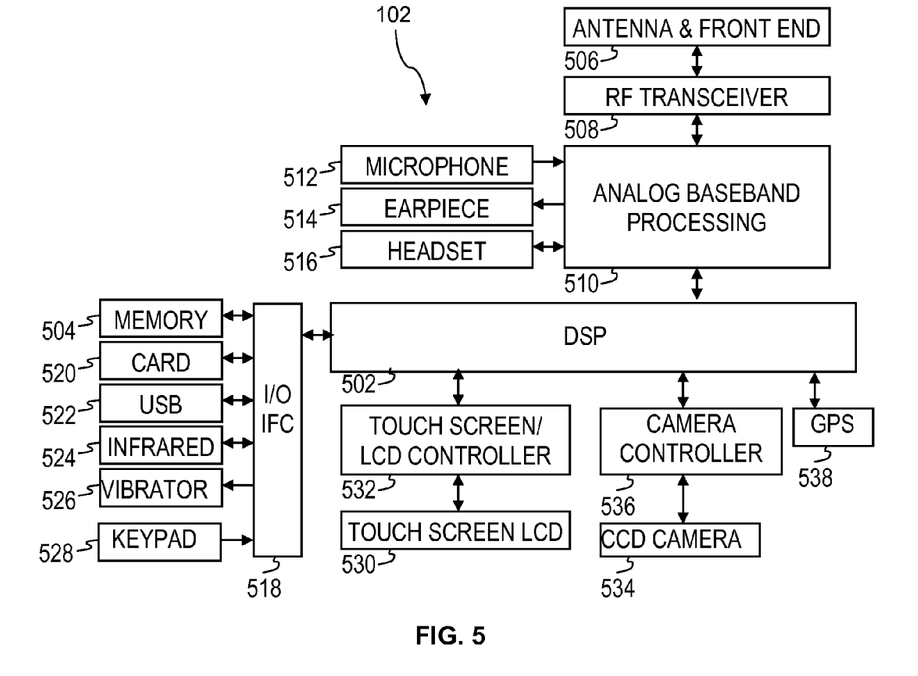
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
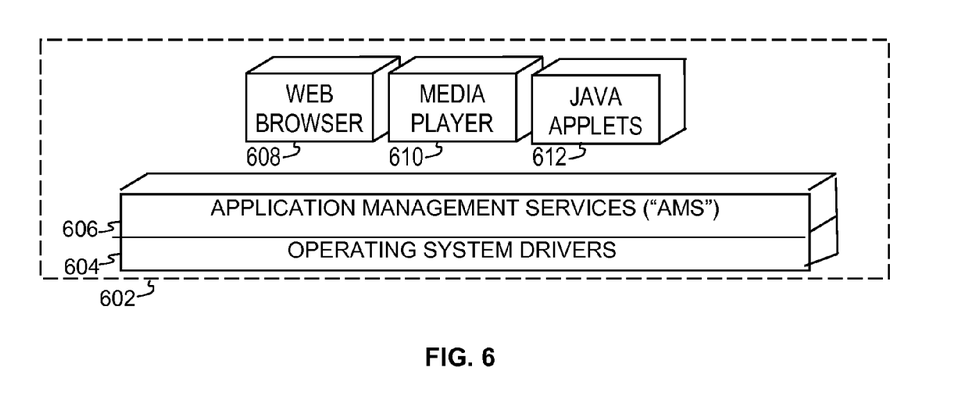
FIG. 6 is a block diagram of a software architecture of a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
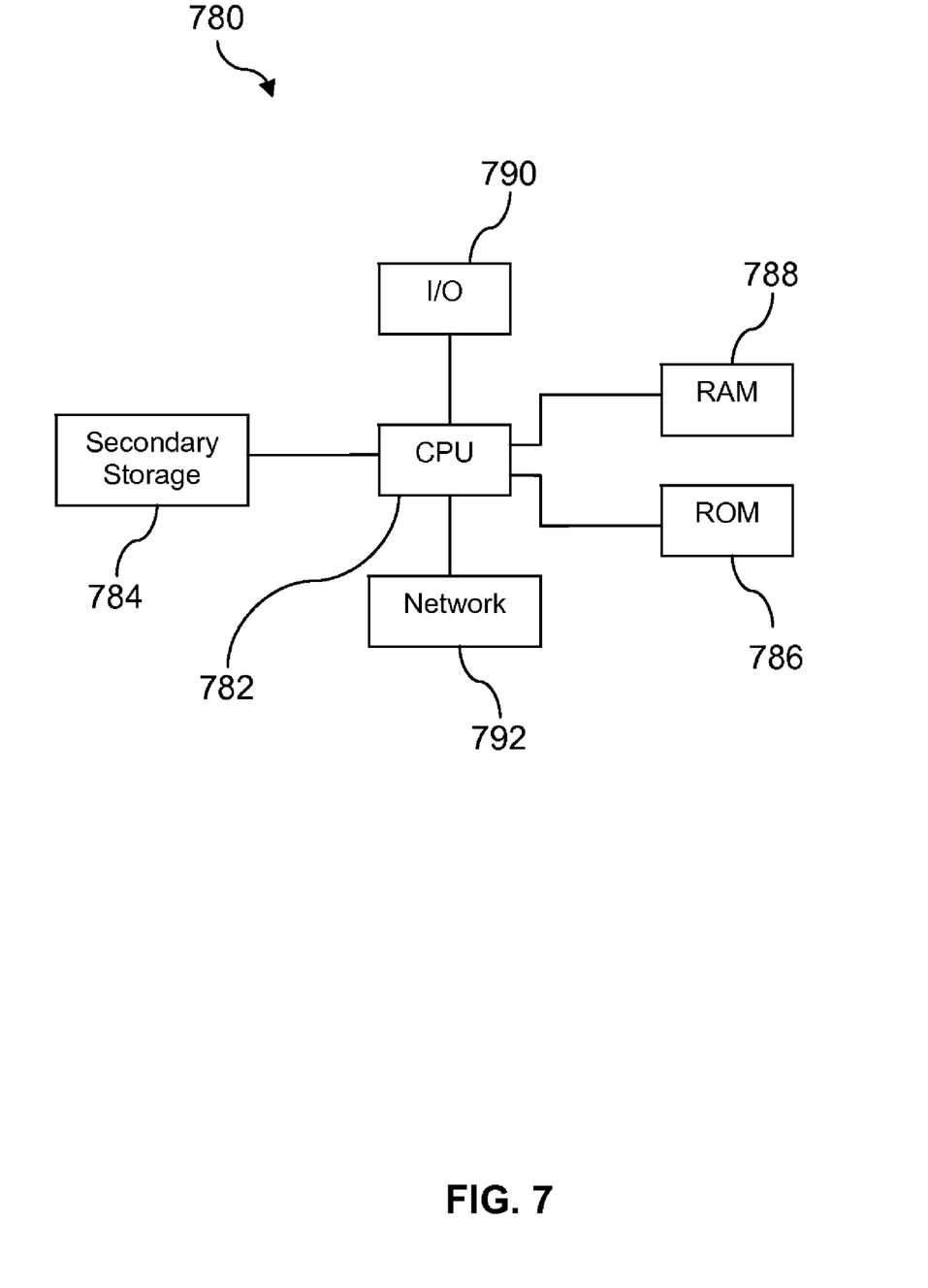
FIG. 7 illustrates an exemplary computer system suitable for implementing an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A system of alternative billing for communication service, comprising:
   a gateway comprising a processor and a memory; and
   an application stored in the memory of the gateway that, when executed by the processor of the gateway,
      receives a text message from an originating electronic device,
      determines that an account balance associated with the originating electronic device lacks sufficient funds to pay for the origination of the text message,
      sends a message to a terminating electronic device identified by the text message to inquire if the terminating electronic device wants to be billed for the origination of the text message in response to the determination that the account balance associated with the originating electronic device lacks sufficient funds to pay for the origination of the text message, wherein the message comprises a plurality of options for accepting charges for transmission of the text message and other text messages from the originating device, wherein the plurality of options for accepting charges comprises an option to accept billing for text messages from the originating device for a user defined period of time and an option to accept billing for an entire thread of text messages, and wherein the thread comprises a series of text messages between the originating and terminating mobile devices,
      when a message accepting at least one of the plurality of options for accepting charges is received from the terminating electronic device, sending the text message to the terminating electronic device and billing the accepted charges to an account balance associated with the terminating electronic device, and
      when a message rejecting at least one of the plurality of options for accepting charges is received from the terminating electronic device, not sending the text message to the terminating electronic device.

2. The system of claim 1, wherein the account balance associated with the originating electronic device is associated with a pre-paid wireless communication service account for the originating electronic device.

3. The system of claim 1, further comprising:
   a server comprising a processor and a memory; and
   an application stored in the memory of the server that, when executed on the processor of the server,
      receives a message from the gateway, the message from the gateway requesting a message to present on a display of the terminating electronic device and a link to a wireless access protocol page,
      transmits a message to the gateway, the message to the gateway comprising the message to present on the display of the terminating electronic device and the link to the wireless access protocol page,
      receiving the message accepting billing for origination of the text message from the terminating electronic device, and
      in response to receiving the message accepting billing of origination of the text message, sending a message to a billing server to create a billing record for the origination of the text message in the account associated with the terminating electronic device.

4. The system of claim 3, wherein the message to present on the display of the terminating electronic device comprises a selection to pay for the origination of the present text message, a selection to pay for the origination of any text message from the originating electronic device, and a selection to not pay for the origination of the text message from the originating electronic device.

5. The system of claim 1, wherein the application stored in the memory of the gateway further:
   receives a text message from a second originating electronic device, the text message directed to a second terminating electronic device and comprising an indication that a billing for origination of a reply to the text message from the second originating electronic device is to be billed to an account associated with the second originating electronic device,
   receives the reply to the text message from the second terminating electronic device, the reply directed to the second originating electronic device, and
   adds a billing entry to the account associated with the second originating electronic device for origination of the reply sent by the second terminating electronic device to be added to the account associated with the second originating electronic device.

6. A system providing alternative billing for communication service, comprising:
   a gateway comprising a processor and a memory; and an application stored in the memory that, when executed by the processor, receives a text message from an originating electronic device, the text message directed to a terminating electronic device, determines that an account balance associated with the terminating device lacks sufficient funds to allow receipt of the text message, sends a message to the originating electronic device to inquire if the originating electronic device wants to be billed for the receipt of the text message in response to the determination that the account balance associated with the terminating device lacks sufficient funds to allow receipt of the text message, wherein the message comprises a plurality of options for accepting charges for receipt of the text message and transmission of at least one reply to the text message, wherein the plurality of options for accepting charges comprises an option to accept billing for text messages from the originating device for a user defined period of time and an option to accept billing for an entire thread of text messages, and wherein the thread comprises a series of text messages between the originating and terminating mobile devices, in response to receipt of a selection of at least one of the plurality of options for accepting charges, receives the at least one reply to the text message from the terminating electronic device, the at least one reply directed to the originating electronic device, and sends a message to a billing server directing that the bill for the at least one reply be added to the account associated with the originating electronic device.

7. The system of claim 6, wherein the application further sends a message to the billing server directing that a bill for the at least one reply added to the account associated with the terminating electronic device be destroyed.

8. The system of claim 6, wherein the application further sends a message to the billing server directing that a credit to offset a bill for the at least one reply previously added to the account associated with the terminating electronic device be added to the account associated with the terminating electronic device.

9. The system of claim 6, wherein the text message is one of a short message service (SMS) text message and an email message.

10. The system of claim 6, wherein the originating electronic device and the terminating electronic device are selected from the group consisting of a mobile phone, a personal digital assistant, a media player, and a gaming device.

11. The system of claim 10, wherein the text messages transmitted and received by the originating electronic device and the terminating electronic device are conveyed at least partly over wireless links provided by at least one of a code division multiple access (CDMA) technology, a global system for mobile communications (GSM) technology, a long-term evolution (LTE) technology, and a worldwide interoperability for microwave access (WiMAX) technology.

12. A method of billing for text messaging, comprising:

receiving a text message from an originating electronic device, the text message addressed to a terminating electronic device;

determining that a pre-paid account associated with the originating electronic device lacks funds to pay for the origination of the text message;

sending a message to the terminating electronic device in response to the determining, the message comprising an indication that the originating electronic device has attempted to send a text message to the terminating electronic device but lacks funds to pay for originating the text and a plurality of options for accepting charges for transmission of the text message and other text messages from the originating device, wherein the plurality of options for accepting charges comprises an option to accept billing for text messages from the originating device for a user defined period of time and an option to accept billing for an entire thread of text messages, and wherein the thread comprises a series of text messages between the originating and terminating mobile devices;

receiving a confirmation message that the terminating electronic device has selected at least one of the plurality of options and agreed to pay for originating the text;

based on the confirmation message, adding a billing entry to an account associated with the terminating electronic device for the origination of the text message; and based on the confirmation message, sending the text message to the terminating electronic device.

13. The method of claim 12, wherein the text message is one of a short message service (SMS) text message and an email text message.

14. The method of claim 12, wherein the confirmation message approves payment of origination of only the current origination of the text message by the originating electronic device.

15. The method of claim 12, wherein the confirmation message approves payment of any origination of a text message by the originating electronic device.

16. The method of claim 12, wherein determining that the pre-paid account associated with the originating electronic device lacks funds to pay for the origination of the text message comprises sending a query to a billing server.

17. The method of claim 12, wherein the account associated with the terminating electronic device is a post-paid account.

18. The method of claim 12, wherein the account associated with the terminating electronic device is a pre-paid account.

19. The system of claim 1, wherein the plurality of options for accepting charges for transmission of the text message and other text messages from the originating device further comprises at least one of option to accept billing for the text message and an option to accept billing for a number of text messages from the originating device.

20. The system of claim 1, wherein the application stored in the memory of the gateway further:

receives a second text message from a second originating electronic device, the second text message from the second originating electronic device directed to a second terminating electronic device, determines that an account balance associated with the second terminating device lacks sufficient funds to allow receipt of the second text message, sends a message to the second originating electronic device to inquire if the second originating device wants to be billed for the receipt of the second text message in response to the determination that the account balance associated with the second terminating device lacks sufficient funds to allow receipt of the second text message, wherein the message comprises a plurality of options for accepting charges for receipt of the second text message and transmission of at least one reply to the second text message, when a message accepting billing for the receipt of the second text message is received from the second originating electronic device, sends the second text message to the second terminating electronic device, and
when a message rejecting billing for the origination of the second text message is received from the second originating electronic device, does not send the second text message to the second terminating electronic device.

* * * * *